United States Patent Office  3,406,138
Patented Oct. 15, 1968

3,406,138
SCUM - FREE LAMINATING RESINS PREPARED BY ADMIXING A SODIUM SALT OF AN AMINOPOLYCARBOXYLIC ACID WITH AN AMINOPLAST
Thomas Anas, Springfield, James D. Larkin, West Springfield, and John J. Watson, Chicopee Falls, Mass., assignors to Monsanto Company, a corporation of Delaware
No Drawing. Filed Dec. 20, 1963, Ser. No. 332,278
4 Claims. (Cl. 260—29.4)

This invention relates to a thermosettable resin system and more particularly to a thermosettable aminoplast resin system consisting of an aminoplast resin and a particular additive.

Thermosettable aminoplast resins generally of the melamine-formaldehyde type are used extensively for preparing thermoset decorative laminates. Such resins have achieved great commercial success and are well-known in the art. When applying the resins, they are dissolved in water or an alcohol-water system to prepare a resin treating bath through which paper is passed and impregnated with the resin. The resin impregnated paper is then dried, assembled with appropriate core stock paper and then pressed into a decorative laminate. One of the big drawbacks that has been encountered with the above-described system is that due to the water conditions consisting in the various local areas scum forms on the surface of the resin bath. This scum will clog the treating equipment requiring downtime thereof for purposes of cleaning. A more serious drawback is that the scum is picked up by the paper during the treating operation and is carried through the system and forms spots in the treated paper. This affects the finished decorative laminate and renders it completely unsatisfactory. It has been now discovered that by incorporating certain additives with the resin, such additives reduce the scum effect.

Therefore, it is an object of this invention to provide a thermosetting resin system.

Another object of this invention is to provide a thermosetting aminoplast resin system containing a particular additive.

Other objects of this invention will in part be obvious and will in part be set out and appear hereinafter.

Briefly, the objects of this invention are attained by admixing with an aminoplast resin a particular additive which is either a sodium salt of amino polycarboxylic acid chelating agents or mixtures thereof with a defoamer.

The following examples are set forth to illustrate more clearly the principles and practices of this invention to one skilled in the art and they are not intended to be restrictive but merely illustrative of the invention herein set forth. Unless otherwise stated, all parts and percentages contained herein are on a weight basis.

EXAMPLE I

A melamine-formaldehyde resin as prepared by reacting 2.5 mols of formaldehyde per mol of melamine under alkaline conditions. The resin is spray-dried into a powdered material.

A solution of the resin is then prepared by dissolving 50 parts of the powdered resin in 50 parts of a mixture of 4% ethanol and 96% water. The solution is prepared under agitation. When the resin is completely dissolved in the solution, the resin solution is poured into a surface pan and observed for formation of scum or impurities. Observation of the system shows that scum forms on the surface of the resin solution.

EXAMPLE II

Example I is repeated except that 0.05 weight percent of the tri-sodium salt of hydroxyethylethylenediaminetriacetic acid is added to the solvent medium prior to dissolving the resin therein. The resin solution is then prepared in the same fashion and poured into an open shallow pan. No scum or foreign material forms on the surface of the resin even after standing for 3 days at room temperature.

EXAMPLE III

Example II is repeated except that 0.1 weight percent of the tri-sodium salt of the hydroxyethylethylenediaminetriacetic acid and .05 weight percent of a silicone defoaming agent (an aqueous emulsion of a polysiloxane) is added to the solvent medium prior to dissolving the resin therein. The resin solution is prepared in the same manner and when poured into an open shallow pan, no scum or foreign impurities form on the surface thereof. The resin is then severely agitated to form foam on the surface thereof. The foam quickly disperses.

This invention is directed to a thermosettable aminoplast resin system consisting of in admixture an aminoplast resin and a particular additive. The additive employed herein is either the sodium salt or certain amino polycarboxylic acid chelating agents or mixtures thereof with a defoamer. It has been discovered that the use of such additives prevents the formation of scum in the resin system when dissolved in water to prepare a resin solution for treating paper. It is believed that this scum which forms is due to metal-containing compounds dissolved in the water. The metallic component exists as a positively charged ion in solution. When they come into contact with the resin, they form certain insoluble materials which are detrimental to the satisfactory use of the resin system. In addition the resin solution so prepared in certain situations has a tendency to have severe foaming problems when the resin is dissolved in water or in the water-alcohol mediums. These problems either separately or together result in poor performance of the resin when used to prepare decorative laminates. They will leave unsightly spots on the surface of the decorative laminate thereby marring the aesthetic beauty of the surface. The scum forming in the resin solution as described above will also clog equipment and require undesirable downtime thereby affecting process conditions and increasing operational costs. Therefore, when using the resin system of this invention, these undesirable problems are greatly reduced or eliminated.

The chelating agents that are suitable for use in the instant invention are the sodium salts of amino polycarboxylic acids and more particularly the sodium salts of amino tri- and penta-acetic acids. The amounts of the chelating agent employed herein can vary from 0.005–1.0 weight percent and preferably 0.05–0.3 weight percent based on the weight of thermosettable aminoplast resin. To employ more than 1.0 weight percent would have little or no additive effect in reducing or eliminating the scum resulting in the resin solution. Any of the sodium salts of the particular amino tri- and penta-acetic acids can be employed in the practice of this invention. Typical examples of these chelating agents are the tri- and disodium salts of nitrilotriacetic acid, nitrilotriacetic acid monohydrate and N-hydroxy ethylethylenediaminetriacetic acid and the penta-sodium salt of diethylenetriaminepenta-acetic acid. The preferred chelating agents to be employed in practice of this invention are the tri-sodium salts of the amino tri- and penta-acetic acids and in particular the tri-sodium salt of hydroxyethylethylenediaminetriacetic acid.

If foaming of the resin treating solution should occur during preparation or use thereof, a defoamer can also be employed along with the chelating agent. The amount of defoamer that can be employed herein can vary between 0.005 to 0.1 weight percent based on the weight of the aminoplast resin. To employ more than 0.1 weight percent of the defoamer may cause the formation of a stable foam without dispersion thereof. The preferred amount of the defoamer to be employed in one embodiment of this invention is 0.03–0.08 weight percent. Any of the defoamers can be used in the practice of this invention. However, the particular useful defoamers are the silicones, carbinols, hexanols, phosphates, esters and fatty acid derivatives. The preferred defoamer to be employed herein is a silicone defoamer.

It should be noted that when employing a defoamer with the chelating agent, the amount of chelating agent may be reduced. It is desirable for example to employ the mixture on a 2–1 basis, i.e., two parts of the chelating agent per one part of the defoamer. However, this can vary depending upon the desired performance wanted and is not by any means a limiting feature as to the ratio of chelating agent to defoamer.

When the resin of this invention is used for treating paper, a laminating syrup is first prepared by dissolving 40–60 weight percent of the resin in a, correspondingly, 60–40 weight percent of a solvent medium. The solvent medium can consist of either water or a mixture of a major amount of water and a minor amount of an acyclic alcohol containing 1–4 carbon atoms, e.g., methanol, ethanol, ethylene glycol, glyceryl, propylene glycol, etc. The precise quantity of acyclic alcohol required in the water-alcohol solvent medium will depend upon the specific structure of the resin, but generally will be within the range of 0.5–40 weight percent and, preferably, less than 5 weight percent of the solvent medium. Laminating syrups of the above type may be stored for periods of 6–8 weeks at temperatures in the range of 20–30° C. with little or no precipitation of the resin from the solution.

In the practice of this invention, it is desirable to add the chelating agent or mixture of chelating agent and defoamer directly to the solvent medium before dissolving the resin therein. Alternatively, the additives may be introduced to the reaction kettle at the end of the reaction or at the beginning thereof. Even if the additives are added at the beginning of the reaction, it is believed that the additives probably do not react with the aminotriazine and formaldehyde components. The additives become dried along with the resin during the spray-drying thereof. They are uniformly mixed throughout the resin system.

Any of the amino compounds are suitable for use in the practice of this invention and include such compounds as urea, ethylurea, thiourea, dicyandiamide, triazines, etc. However, particularly useful are the aminoplast resins consisting of aminotriazine-aldehyde resins and more particularly the melamine-formaldehyde resins. The melamine-formaldehyde resins are prepared by the condensation reaction of 1.5–6.0 mols of formaldehyde per mol of melamine in the presence of an alkaline catalyst. The melamine-formaldehyde resins may also have incorporated therein certain modifying materials such as thiourea, toluene sulfonamide, benzene sulfonamide, guanamines, substituted guanamines, glucosides, sucrose, carbamates, polyhydroxy compounds, polyamines, etc., latent curing catalysts such as acid salts of tertiary amines, or mixtures thereof. These modifying materials also aid in the post-formable properties of the decorative laminate prepared therefrom. Other aminoplast resins which can be employed in the practice of this invention are urea formaldehyde, urea acetaldehyde, urea butyraldehyde, butylated melamine formaldehyde, melamine acetaldehyde, melamine butyraldehyde and the melamine formaldehyde resin set forth in U.S. Patent 2,852,489. The preferred aminoplast resin to be employed in the practice of this invention is the melamine-formaldehyde resin prepared by reacting 2–3 mols of formaldehyde per mol of melamine and having incorporated therewith 1–20 weight percent of toluene sulfonamide based on the weight of melamineformaldehyde and 5–35 weight percent of sucrose based on the total weight of resin solids and up to 10 weight percent of an acid salt of a tertiary alkanol amine.

The thermosettable aminoplast resin system of this invention can be used to prepare thermoset decorative laminates. For example, inert filler sheets or alphacellulose paper, viscose rayon paper, glass cloth or cloth prepared from cotton, wool or synthetic fibers are impregnated with about 30–80 weight percent of the resin and then dried to a specified volatile content generally in the order of 3–10%. An assembly of such resin impregnated sheets is then subjected to a pressure in the order of 100–2000 lbs./sq. in. and is heated for a period of time ranging from about ½–60 minutes at a temperature of about 200–350° F.

Decorative laminates prepared by the above-described process are generally an assembly of (1) a rigid substrate, (2) a thermoset aminoplast resin impregnated decorative print sheet, i.e., a paper sheet having a design printed thereon, and (3) a thermoset aminoplast resin impregnated top or overlay sheet. In the decorative laminate, the rigid substrate may consist of any suitable material such as plywood, a resin-bonded wood fiber board, or the like, a plurality of resin-impregnated sheets, etc. The resins commonly used to impregnate the resin-impregnated sheets, are of the phenol-formaldehyde type. The print sheet or the overlay sheet or preferably both of the rigid thermoset resin-bonded decorative laminate assembly is impregnated with the thermosettable aminoplast resin system of this invention. In some cases it may be desirable to employ only a decorative print sheet without the use of an overlay sheet. In such a situation, the print sheet is generally passed through the resin bath two or more times or through two different resin baths.

The thermosettable aminoplast resin system of this invention is also suitable for use in preparing decorative laminates having post-forming properties. In such a laminate, the rigid substrate may be of a post-formable material such as a plurality of paper sheets (preferably creped), impregnated with a specially formulated post-formable phenol-formaldehyde type of thermosettable resin. The print sheet or the overlay sheet or both can then be impregnated with the resin of this invention, which decorative laminate would then have the desired characteristics as set forth previously.

In addition, the thermosettable aminoplast resin system of this invention can be employed to prepare thermoset plastic dinnerware. Generally, an overlay sheet of rayon or alpha-cellulose paper, commonly known as dinnerware foil, is impregnated with the resin system of this invention. However, a greater quantity of the latent curing catalyst is employed with the aminoplast resin in relationship to that which is used with the aminoplast resin to prepare decorative laminates. An assembly of the materials is then subjected to a pressure of about 500–3000 lbs./sq. in. and is heated for a period of time ranging from about 15 seconds to about 180 seconds and at a temperature of about 300–350° F.

The aminoplast resin system of this invention can also be used in such other applications as the bonding of fibers to form fibrous structures which are used as oil filters, water filters, air filters, etc., as orthopedic resins and as the bonding of wood veneer to form laminated plywood structures.

It will thus be seen that the objects set forth above, among those made apparent from the description, are efficiently attained, and since changes may be made in carrying out the above process and in the composition set forth without departing from the scope of this invention, it is intended that all matters contained in the above description shall be interpreted as illustrative and not in a limiting sense.

What is claimed is:

1. A thermosettable aminoplast resin system consisting of an aqueous admixture of a thermosettable melamine aminoplast resin and an additive selected from the group consisting of the sodium salts of amino tris- and penta-acetic acid chelating agents and mixtures thereof with a defoaming agent; said additive being present in an amount of 0.005–1.0 weight percent based on the weight of the thermosettable melamine aminoplast resin; said melamine aminoplast resin being the reaction product of 1.5–6.0 mols of formaldehyde per mol of melamine.

2. The composition of claim 1 wherein the additive is present in an amount of 0.05–0.3 weight percent.

3. The composition of claim 1 wherein the additive is a mixture of the trisodium salt of N-hydroxyethylethylenediaminetriacetic acid chelating agent and a silicone defoaming agent.

4. The composition of claim 3 wherein the additive is 40–70 weight percent of the chelating agent and, correspondingly, 60–30 weight percent of the defoaming agent.

References Cited

UNITED STATES PATENTS

| | | | |
|---|---|---|---|
| 3,009,832 | 11/1961 | Burkitt | 117—161 |
| 3,198,761 | 8/1965 | O'Donnell | 260—29.4 |
| 3,313,779 | 4/1967 | White | 260—59 |

OTHER REFERENCES

American Journal of Pharmacy: Bergy, vol. 126, #6, June 1954 (copy in 252–89 Chelate), pp. 198–211.

Technical Association of Paper and Pulp Industries: vol. 36, No. 6, June 1953, p. 20A (TAPPI) (copy in Group 140).

WILLIAM H. SHORT, *Primary Examiner.*

H. S. SCHAIN, *Assistant Examiner.*